United States Patent [19]

Carteau

[11] Patent Number: 5,225,967
[45] Date of Patent: Jul. 6, 1993

[54] INFORMATION PROCESSING SYSTEM ARCHITECTURE INCLUDING TWO BUSES

[75] Inventor: Daniel Carteau, Montigny le Bretonneux, France

[73] Assignee: Bull, S.A., Paris, France

[21] Appl. No.: 827,512

[22] Filed: Jan. 29, 1992

Related U.S. Application Data

[63] Continuation of Ser. No. 557,860, Jul. 26, 1990, abandoned.

[30] Foreign Application Priority Data

Jul. 27, 1989 [FR] France ................ 89 10155

[51] Int. Cl.$^5$ ............................ H01R 9/00
[52] U.S. Cl. .......................... 361/407; 361/415
[58] Field of Search .............. 361/412, 413, 415; 211/41; 364/238-238.7, 243, 251

[56] References Cited

U.S. PATENT DOCUMENTS

| | | | |
|---|---|---|---|
| 3,681,665 | 8/1972 | Olds et al. | 361/413 |
| 3,710,197 | 1/1973 | Olds et al. | 361/413 |
| 4,470,100 | 9/1984 | Rebaudo et al. | 361/413 |

FOREIGN PATENT DOCUMENTS

| | | |
|---|---|---|
| 0111871 | 6/1984 | European Pat. Off. |
| 0117954 | 9/1984 | European Pat. Off. |
| 0262923 | 4/1988 | European Pat. Off. |
| 3513542 | 4/1985 | Fed. Rep. of Germany |

OTHER PUBLICATIONS

"Microprocessing & Microprogramming", vol. 21, Nos. 1-5, Aug. 1987, pp. 333-338, Section 6, Tolerating Bus Failures, p. 337.

"Computer Technology Review", vol. 4, No. 3, 1984, 35-36, 38, Shared Memory Devices Can Link PDP-11s into Load-Balanced Clusters, p. 35, col. 1; p. 36, col. 3, FIG. 1.

"Databus", Jul./Aug. 1987, pp. 14-19, Deventer, N.L., Achtergronden van de VME-Bus; FIG. 1.

*Primary Examiner*—Leo P. Picard
*Assistant Examiner*—D. Sparks
*Attorney, Agent, or Firm*—Kerkam, Stowell, Kondracki & Clarke

[57] ABSTRACT

An information processing system architecture (ORDI), in which the various constituent elements ($B_1$-$B_6$, $A_1$-$A_6$, $C_1$-$C_4$) comprise a plurality of boards ($CDI_i$ and $CGI_j$), each embodied by printed circuits carrying a plurality of integrated circuits, and including at least two sets of elements ($ENSI_1$, $ENSI_2$), all or some of the elements of one set being identical to all or some of the elements of the other. The sets are associated with two system buses of the parallel type (PSBA, PSBBI) that assure both communications and the transfer of data and electrical energy among the boards. The two buses have a total or partial overlap zone (ZC) between them, on which either one or more elements ($C_1$-$C_2$, $C_3$-$C_4$) common to the two sets exclusively, and elements belonging to the first set ($ENSI_1$, $A_5$ and $A_6$) and/or to the second set ($ENSI_2$, $B_5$ and $B_6$), are connected.

12 Claims, 6 Drawing Sheets

FIG.1

PRIOR ART

INFORMATION PROCESSING SYSTEM ARCHITECTURE INCLUDING TWO BUSES

This application is a continuation of application Ser. No. 07/557,860, filed Jul. 26, 1990, now abandoned.

FIELD OF THE INVENTION

The present invention relates to an information processing system architecture including two buses. It is applicable to any type of computer.

BACKGROUND OF THE INVENTION

Regardless of the type of information processing system, various basic functions are common in various forms to all these systems. These basic functions are effected by various structural, hardware and software elements of the information processing system. In simplified form, let it be assumed that this information processing system is a conventional computer comprising a central processor unit or CPU, also known as a host system, and various peripheral devices, which are either magnetic peripherals such as disk memories or tape drives, or input/output peripherals enabling the exchange of data with the outside (such as printers and various screen terminals, etc).

The central unit or host system is embodied by at least one central processor unit (or in the case of the information processing system of the multiprocessor type, by a plurality of processors) and a main memory to which the processor or processors are connected, and one or more input/output processors that assure the monitoring of the exchange of data between the memory and the various peripherals.

The physical transfer of data between the CPU and the peripheral or peripherals associated with it is performed by way of a coupler (or couplers) connected on the one hand to the output bus of the CPU and on the other to the peripheral that is to be used.

All the constituent functional elements comprising an information processing system, that is, CPUs or input/output processors, random-access memories and read-only memories, input/output controllers or peripheral controllers, are disposed on a set of boards, the dimensions of which are generally standardized. Each board comprises a printed circuit, on which a plurality of integrated circuits or chips are disposed, each of them comprising well-defined functional systems or subsystems manufactured on a large scale by the various manufacturers of electronic components, such as Texas Instruments, Motorola, Intel, and so on.

These boards are generally connected to the same parallel bus, which assures communications among the various processors, the transfer of data between the various boards, and the supply of electricity to the boards. To this end, the boards are provided with male plugs (generally two plugs) making it possible to connect them physically to the bus, which in turn has corresponding female plugs disposed at a certain number of predetermined connection sites, or slots.

The bus commonly known as Multibus II (a trademark of the Intel Corporation) is presently among the most often-used buses in the industry. This bus is the product of work by a group including 17 other American and European corporations besides Intel. Among these corporations are AMD, Tektronics, Hewlett-Packard, ICL, Siemens, the present assignee company, and others. This Multibus II exhibits good performance as well as great versatility and reliability in use.

As its name indicates, the architecture of a Multibus II is structured around a plurality of buses and includes one main bus and secondary buses. Only the main bus is standardized by the IEEE standard-1296 (IEEE stands for the Institute of Electrical and Electronic Engineers), and only this bus pertains to the invention.

This bus is called a PSB (for parallel system bus). It is intended for general use and is designed to operate in a multiprocessor environment, with functions of arbitration, board identification, etc.

The PSB is constructed on the "Double Europe" board format (233×220 mm), with two plugs called $P_1$ and $P_2$, one of which corresponds to the PSB and the other of which is free.

The two plugs are 96-pin models (with three parallel rows of 32 pins) meeting the standards defined by the International Electromechanical Commission in category 603-2IEC096, pertaining to male plugs present on each of the boards, or female plugs disposed on the bus itself. These 96-pin plugs are also defined by DIN standard 41612.

The PSB bus system assures interprocessor communications and data movement. It accepts any type of processor presently available on the market. It has the following characteristics:

An output of 40 megabytes per second in the burst mode, obtained by a clock frequency of 10 MHz for a bus width of 32 bits (in other words 4 8-bit bytes);

Synchronous function, which cancels out the influence of parasitic signals whenever it is inactive; and The capability of working with 8-, 16- or 32-bit processors or of transferring data over 8, 16, 24 or 32 bits.

The Multibus II is a basket type of bus. This means that it is embodied by a printed circuit that carries plugs; IEEE standard 1296 defines each of the conductors that composes it, the dimensions of the boards connected over the bus, the spacing between them, their mechanical characteristics, and so forth. The number of boards that can be connected on the Multibus II is also limited to 20, because with a greater number of boards the performance, or power, is limited by the greater dissipation of energy, the existence of parasitic capacitance and inductance, and so forth. The length of the bus is also limited to 40 cm.

The physical structure of a multiprocessor information processing system architecture is accordingly in the form of a board-carrying basket including a plurality of logic boards (a maximum of 20 for a basket including a Multibus II), of substantially parallelpiped form. The bottom of the basket has a substantially rectangular shape. The basket bottom carries the Multibus, which takes the form of an oriented copper printed circuit that includes a plurality of connection sites (20 in number) on which female 96-pin plugs are disposed. The sides of the basket parallel to its length and perpendicular to the bottom of the basket each include one row of board guides parallel to the inside by which the boards can slide, in order to be connected by the male plugs to the female plugs disposed on the bottom of the basket.

When information processing system architecture designers develop the electronic assembly plans comprising these systems (that is, the set of boards that comprise them), their objectives include both better availability for the information processing system, and good performance.

It will be recalled that for an information processing system, unavailability, or "down time", is the time during which the system or subsystem is unavailable to the customer using it (because of a breakdown, or repair, for general overhaul of the system, for instance). Hence "availability" is defined as the opposite of unavailability.

On the other hand, performance of a predetermined system means the number of transactions it can perform per unit of time. For example, for a disk memory, performance is established by measuring the number of reading and writing operations that can be done during the unit of time (seconds, microseconds, etc.). If availability and high performance are sought, then the problem of doubling the bus is encountered, that is, of achieving an information processing system architecture including two identical electronic sets, each constructed about the same bus, such as a Multibus II type of bus. The physical structure of such a system thus comprises two identical board-carrying baskets. The resultant new architecture, composed of two identical sets, thus provides the desired redundancy, and enables increasing both availability and performance compared with the structure including only a single set.

For internal handling of cases of partial breakdown (these are breakdowns that may arise in some or all of the physical elements comprising the above-defined electronic sets) not by the software of the central processing unit of the information processing system but instead by software contained in one of the aforementioned physical elements, a physical connection is then made between each of the two electronic sets that comprise the architecture of the information processing system.

The connection between the two sets is most powerful when it in fact becomes a third bus over which elements common to the two sets are connected. The disadvantage of this system is that it includes at least two additional boards to make the connection between the two sets, that is, a first connection board connected to the first bus of the first set, and a second board connected to the second bus of the second set. Moreover, if the third bus breaks down, in whatever area, the advantage obtained is then lost: genuine double access, which is intended for the sake of availability, is then no longer available to either the first set or the second set.

Another disadvantage that should also be mentioned is the necessity of connecting the two baskets including the two electronic sets by the same cable, which is relatively expensive and lowers performance.

OBJECT AND SUMMARY OF THE INVENTION

The present invention makes it possible to overcome these disadvantages by arranging two separate sets in the same basket bottom, avoiding specific connections by cable between the two sets, and therefore having very major availability, equivalent to two separate sets, while having elements common to the two sets and high-powered access to them.

According to the invention, the information processing system architecture, the various constituent elements of which comprise a plurality of boards, each embodied by printed circuits carrying a plurality of integrated circuits, including at least two sets of elements, all or some of the elements of one set being identical to all or some of the elements of the other, the sets being associated with two system buses of the parallel type assuring communication and the transfer of data and electrical energy among the boards, is characterized in that between them the two buses have a total or partial overlap zone, on which are connected either one or more elements common to the two sets exclusively, or additionally one or more common elements, of elements belonging to the first set and/or to the second set.

In a preferred embodiment of the invention, the information processing system architecture is characterized in that the first bus has a given number of connection sites, and the second bus is identical and parallel to the first bus offset with respect to it by a given-number of connection sites, in such a manner that the set formed by the two buses includes a first zone ZA where a first set of n boards is connected that is joined to the first bus, and a second zone ZB where a second set of n boards connected to the second bus is connected, the third zone ZC comprising the overlap zone, including (m−n) connection sites.

According to a preferred embodiment, the architecture of the invention, the physical structure of which is a logic board basket, including a basket bottom of substantially rectangular form, having a center of symmetry and a plane of symmetry perpendicular to the plane of the basket bottom and to its large dimension (length), characterized in that the basket bottom carries the first and second buses and includes a first row of (m +n) connection sites of the first bus carrying female plugs all having a first axis of symmetry parallel to the length of the basket bottom, and a second row of (m+n) connection sites of the second bus carrying female plugs and having a second axis of symmetry parallel to the first axis of symmetry, the connection sites and the first and second rows being aligned two by two along the same line parallel to the width of the basket bottom, the plugs of the first row located in a first half (or second half) of the basket on the same side of the plane of symmetry being mounted symmetrically to the plugs of the second row located in the second half (or first half) of the basket on the other side of the plane of symmetry, with respect to the center of symmetry, the boards connected to the sites of the first half being mounted symmetrically with the boards connected to the sites of the second half with respect to this center of symmetry.

Further characteristics and advantages of the present invention will become more apparent from the ensuing description given by way of non-limiting example, taken in conjunction with the drawings.

DESCRIPTION OF THE PREFERRED EMBODIMENT

Figure 1:
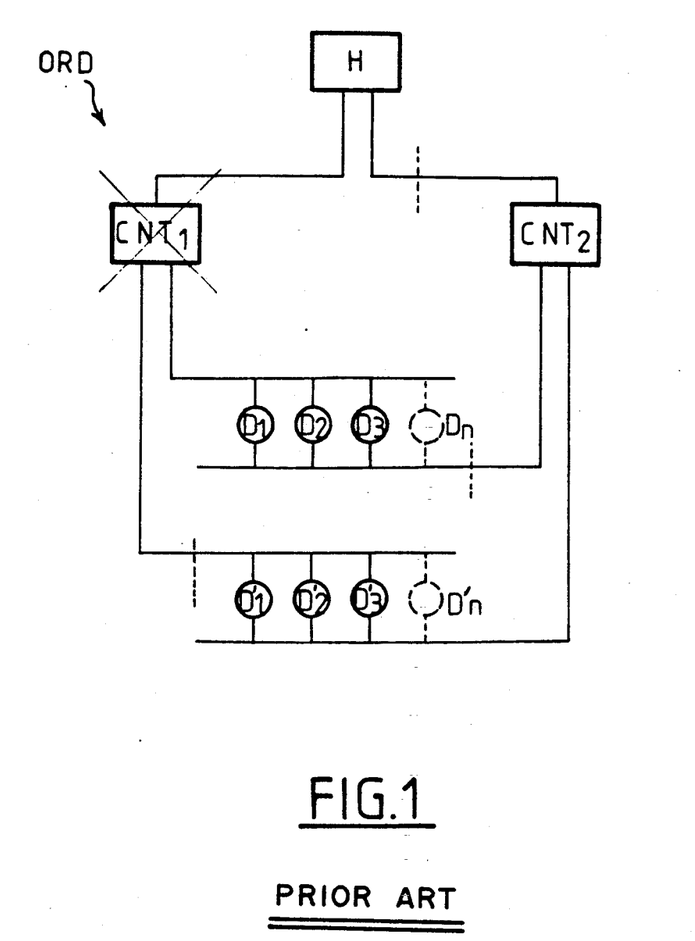
FIG. 1 is a simplified illustration of the concept of availability of an information processing system.

FIG. 1 makes for better comprehension of the concept of availability (or unavailability) of an information processing system.

First, an information processing system ORD will be considered, embodied by the host system H (which is composed of one or more central processing units and associated memories, along with input/output processors and controllers; see above), which is associated with a set of disk memories $D_1, D_2, D_3, \ldots D_n$. These disk memories are all controlled by the same controller $CNT_1$.

Various cases of unavailability are possible:

If the controller $CNT_1$ of the set of disk memories $D_1-D_n$ breaks down, the result is that both the controller $CNT_1$ and the set of associated disk memories $D_1-D_n$ are unavailable for the time required for maintenance representatives or workers to repair of the controller $CNT_1$. Hence the unavailability of the single controller $CNT_1$ can be seen to cause the unavailability of all of the associated disk memories.

The controller $CNT_1$ may work, yet one (or more) of the n disk memories may break down. Only this memory is unavailable. Nevertheless, if the host system H requires information recorded in the unavailable disk memory (for example $D_1$), this may cause serious disturbances in the functioning of the information processing system overall.

To increase the availability of the information processing system ORD, two types of solution are then possible, for example:

1) To prevent the unavailability of any of the disk memories $D_1-D_n$ from disturbing the function of the entire information processing system in the manner described above, a second set of disk memories $D'_1-D'_n$ is then provided, also controlled by CNT1 and identical to the set $D_1-D_n$; each of the disk memories $D'_1-D'_n$ is the mirror image of the corresponding disk memories $D_1-D_n$. This means that the data recorded on the disk memory $D'_1$ are strictly identical to the data recorded in the disk memory $D_1$. Nevertheless, it will be understood that in this case, if the controller $CNT_1$ is defective, then the entire system is unavailable.

2) For the best possible availability, it is accordingly necessary to improve the availability of the system described in the preceding paragraph, by associating one disk memory controller $CNT_2$, identical to the disk memory controller $CNT_1$, to each of the two sets of disk memories $D_1-D_n$ and $D'_1-D'_n$.

Figure 2A:
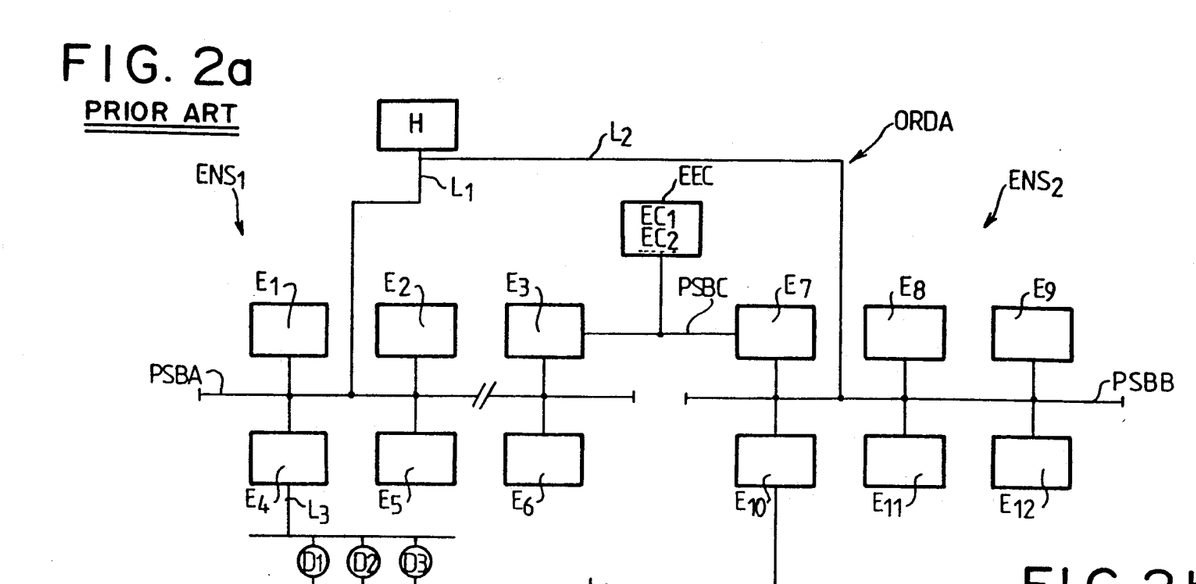
FIG. 2 shows an information processing system of the prior art, including two buses, for example of the Multibus II type, and two sets of identical boards, each one connected to the same single bus, with FIG. 2 including FIGS. 2a and 2b.
Figure 2B:
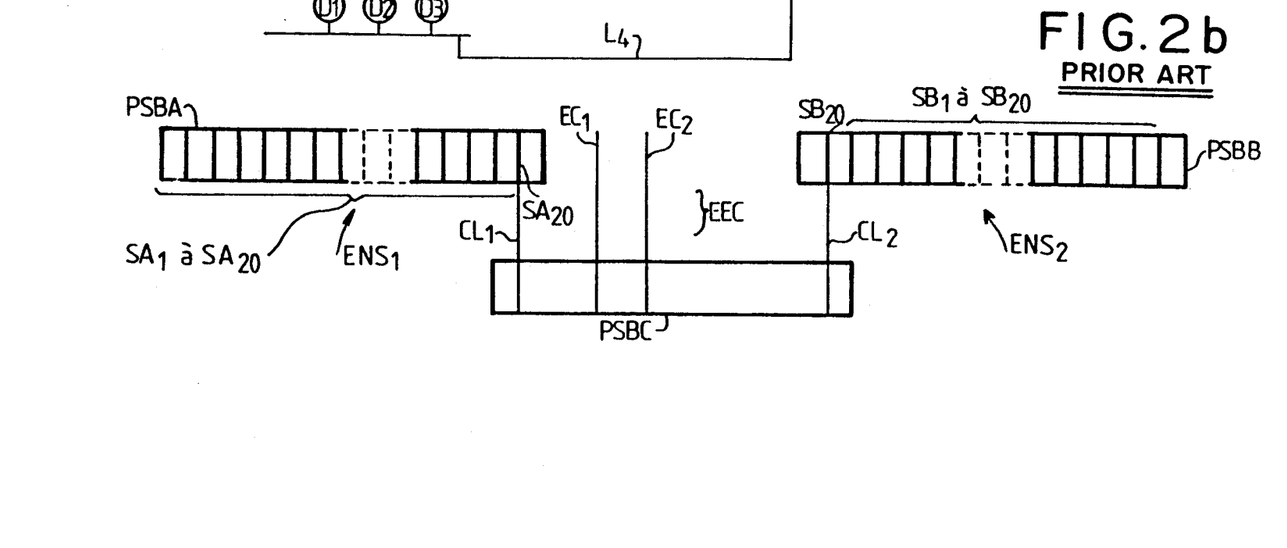

Turning to FIGS. 2a and 2b, an information processing system ORDA according to the prior art is shown, embodied by a host system H and two identical sets of boards $ENS_1$ and $ENS_2$ and one set EEC of elements common to both sets $ENS_1$ and $ENS_2$, affording great availability and good performance.

The first set $ENS_1$ is shown in FIG. 2a as being embodied by six elements $E_1, E_2, E_3, \ldots E_6$, all connected to the same bus of the Multibus II type, that is, the bus PSBA, but it is apparent that it may include more of them, and as has been noted above, up to 20 elements can be connected to the same Multibus II such as PSBA.

The set $ENS_2$ is identical to the set $ENS_1$ and includes six elements $E_7, E_8, \ldots E_{12}$, which are identical to elements $E_1-E_6$, respectively, of the set $ENS_1$.

The elements $E_7-E_{12}$ are connected to the same bus PSBB of the Multibus II type.

To improve the availability of the computer ORDA, the two sets $ENS_1$ and $ENS_2$ are preferably connected, via a set EEC of common elements $EC_1, EC_2,$ and so forth. These elements are in fact connected among one another via the same third bus PSBC. These elements are accordingly accessible simultaneously by any elements of $ENS_1$ and any element of $ENS_2$. Thus the set EEC is connected respectively to element $E_3$ of $ENS_1$ and $E_7$ of $ENS_2$, in FIG. 2a.

The host system H is for instance connected to the set $ENS_1$ via a link $L_1$, and to the set $ENS_2$ via the link $L_2$. (These links $L_1$ and $L_2$ are for example connected to the buses PSBA and PSBB.)

Turning to FIG. 2b, the physical structure of the three buses PSBA, PSBB and PSBC is shown in simplified form.

It is known that the buses PSBA and PSBB of the Multibus II type, defined by the IEEE standard 1296, are of the bottom basket type, and include 20 connection sites, that is, $SA_1-SA_{20}$, for the bus PSBA, and $SB_1-S_{20}$ for the bus PSBB. These various connection sites include standardized female plugs of the DIN 41612 type (see above), to which the male plugs of various boards can be fastened, the boards comprising the elements such as $E_1-E_6$ or $E_7-E_{12}$. The standardized male and female DIN 41612 plugs thus include 96 pins, as already mentioned.

FIG. 2b also shows how the two sets $ENS_1$ and $ENS_2$ are connected. This link includes a linking board $CL_1$ connected to the bus PSBA at the connection site $SA_{20}$, and a board $CL_2$ connected to the connection site $SB_{20}$ of the bus PSBB. $CL_1$ and $CL_2$, respectively, have the elements $E_3$ and $E_7$, for example.

The two connection boards $CL_1$ and $CL_2$ are in turn connected to one another via the third bus PSBC, to which the common elements $EC_1$ and $EC_2$, and so forth of the set of common elements EEC are connected. This same third bus PSBC is either a bus of any arbitrary type, or a bus of the Multibus II type.

In the case where the set of common elements is empty, that is, where there are no common elements per se, the two sets $ENS_1$ and $ENS_2$ are simply connected via the boards $CL_1$ and $CL_2$, which are in turn interconnected by way of a link, such as a cable. In practice, when the number of common elements is relatively low, these elements are connected to one another two by two by a cable link, and the third bus is in fact constituted by a set of cables that connect the common elements to one another two by two.

The structure of the computer ORDA shown in FIG. 2a makes it possible to attain high availability, as the following example will show.

It is assumed for example that the element $E_4$ is a controller of disk memories $D_1, D_2, D_3$, and the controller is connected to set of disk memories $D_1, D_2, D_3,$ ..., by the link $L_3$. The counterpart of the controller $E_4$ in the set $ENS_2$ is the element $E_{10}$, which is connected to the set of disk memories $D_1, D_2, D_3$ via the link $L_4$.

If the controller $E_4$ is defective and breaks down, then access (by the host system) to the data contained in the set of disk memories $D_1$, $D_2$, $D_3$ can be made in two ways; first, by the route comprising the link $L_1$, the bus PSBA, the element $E_3$, the bus PSBC, and the common elements EEC, the element $E_7$ and the controller $E_{10}$; second, by the route comprising the link $L_2$ and the controller $E_{10}$ followed by the link $L_4$. It can be seen that there are two possible solutions to overcome a possible breakdown of any of the elements $E_1-E_6$ of the set $ENS_1$ (and clearly the situation is the same for any elements of the set $ENS_2$). It can be seen that the probability of unavailability of the computer ORDA caused by the breakdown of any of the constituent elements of one of the two sets $ENS_1$ and $ENS_2$ is quite low.

Moreover, when the controller $E_4$ becomes defective, it is command software contained in any of the boards of one of the sets $ENS_1$ or $ENS_2$ that employs the process making it possible to gain access to the data of the set $D_1-D_3$ by one or the other of the above two routes to accomplish this task. Hence, unlike the structure of FIG. 1, there is no need to make use of software contained in the host system H.

Nevertheless, as has been mentioned above, the structure shown in FIG. 2a has the following disadvantages:

First, the two sets $ENS_1$ and $ENS_2$ physically comprise two separate baskets, connected to one another via a third bus PSBC, making this a relatively complicated and expensive structure;

second, if the PSBC link is interrupted for any reason whatever, the availability of the computer ORDA is seriously affected.

Figure 3:
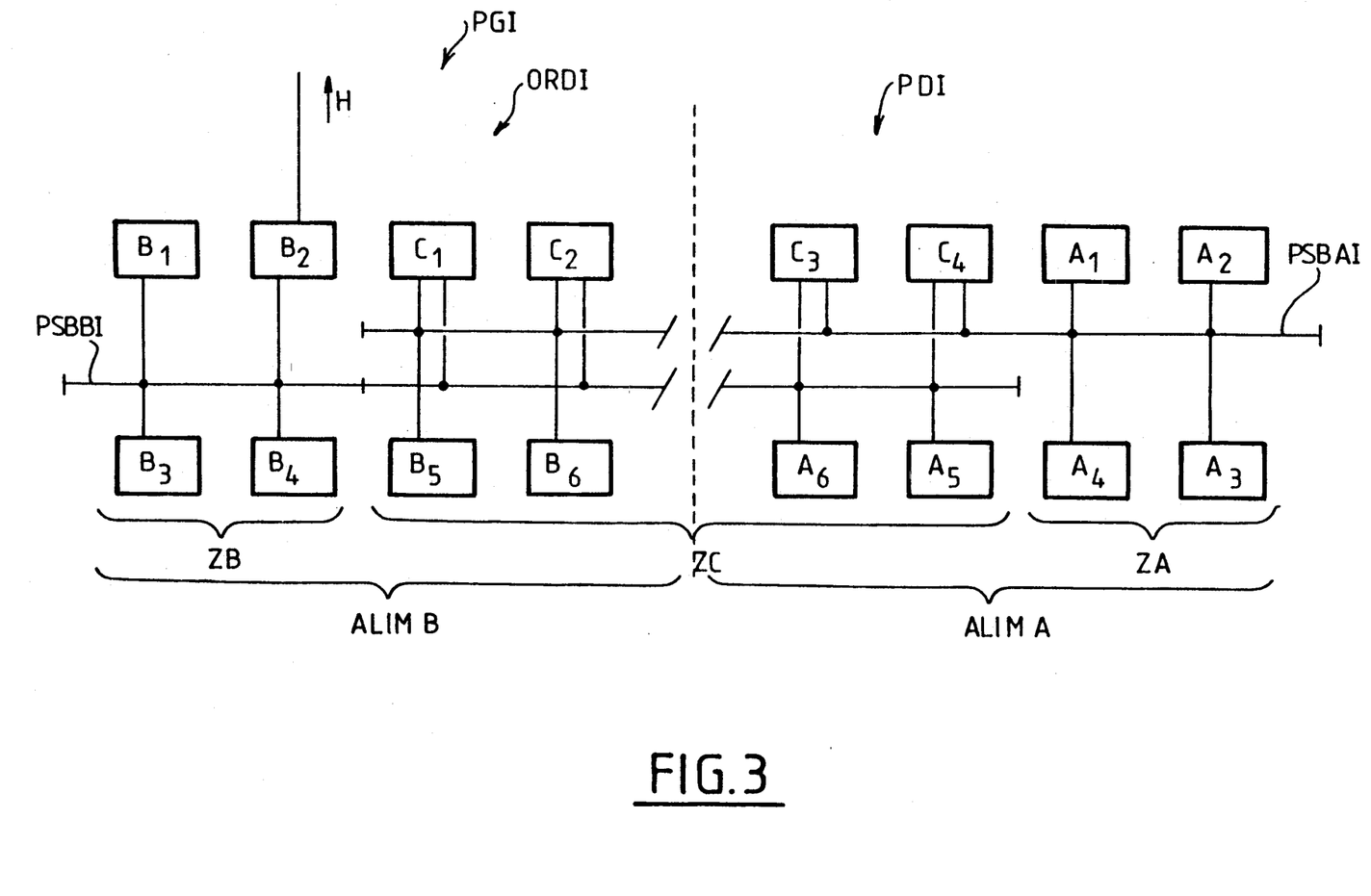
FIG. 3 is a simplified wiring diagram of an information processing system according to the invention, including two buses of the Multibus II type that are parallel to one another and are staggered with respect to one another.

FIG. 3 will now be described, which shows an exemplary embodiment of a system architecture according to the invention, which is relatively simple in concept and is less expensive than that of FIG. 2, yet it assures greater availability.

The information processing system ORDI according to the invention includes a host system H identical to those shown in FIGS. 1 and 2; a first set $ENSI_1$ composed of elements $A_1-A_6$; a second set $ENSI_2$ composed of elements $B_1-B_6$; and a set EECI of common elements $C_1-C_4$. In FIG. 3, H (not shown for the sake of simplicity) is connected to the element $B_2$, but it certainly may be connected instead directly to the bus PSBAI and/or to the bus PSBBI.

In the exemplary embodiment described here, the two sets $ENSI_1$ and $ENSI_2$ are identical. The elements $A_1-A_6$ are identical to the corresponding elements $B_1-B_6$, respectively. For obvious reasons of simplification in FIG. 3, only six elements have been shown for the sets $ENSI_1$ and $ENSI_2$, and four elements for the set of the common elements EECI, but it is clear that this number of elements may be different and may be even less or greater.

The information processing system ORDI according to the invention includes two identical buses parallel to one another, preferably of the Multibus II type, and they are staggered with respect to one another by a length that enables the connection of n elements.

It is assumed that the number of elements connectable to the same bus PSBAI or PSBBI is equal to m; for a Multibus II, the number m=20. The elements $A_1-A_6$ of $ENSI_1$ are connected to PSBAI, and the elements $B_1-B_6$ of $ENSI_2$ are connected to PSBBI.

The architecture, for system ORDI thus includes three different zones, that is, ZA, ZB, and ZC.

Zones ZA and ZB are zones corresponding to the offset between the two buses PSBAI and PSBBI, where the two buses do not face one another.

Zone ZA corresponds to a portion of the bus PSBAI where only elements of the set $ENSI_1$, such as $A_1-A_4$, are connected.

Similarly, zone ZB corresponds to the portion of the multibus PSBBI where only the elements of the set $ENSI_2$, such as $B_1-B_4$, are connected. Hence in this specific case, n=4, but it is understood that this number may also be different and may be less than or greater than this number (as in the case of FIGS. 4 and 5). It is even possible for n to equal 0.

Zone ZC corresponds, physically, to the portions of the two buses PSBAI and PSBBI that face one another (see the description below relating to FIGS. 4 and 5). The elements common to the two sets $ENSI_1$ and $ENSI_2$, such as $C_1-C_4$, are connected here. In the exemplary embodiment described now with respect to FIG. 3, elements of the set $ENSI_1$ such as $A_5$ and $A_6$ connected to the bus PSBAI and elements of the set $ENSI_2$ such as $B_5$ and $B_6$ connected to the bus PSBBI are also connected in this zone ZC.

More generally, the common zone ZC includes either only elements common to both sets $ENSI_1$ and $ENSI_2$, or in addition to the common elements it may include elements belonging to the set $ENSI_1$ and/or elements belonging to the set $ENSI_2$. The essential factor is that in either of the above two cases, the sets $ENSI_1$ and $ENSI_2$ remain identical to one another.

In the case where only some of the elements of the sets $ENSI_1$ and $ENSI_2$ are identical, the above reasoning applying to the two sets in their entirety applies integrally to the identical portions of the elements of these sets. In that case, the non-identical portions are preferably, but not exclusively, connected to the zones ZA and ZB.

It is seen that the zone ZC is such that m-n elements can be connected here. If n=0, the overlap zone ZC then includes m connection sites; in that case, the overlap zone is said to be total.

Thus as can be seen in FIG. 3, the system ORDI can be broken down, from the standpoint of electrical supply to the various boards comprising the various elements of the two sets $ENSI_1$ and $ENSI_2$, into a first portion, that is, the right-hand portion PDI, and a second portion, the left-hand portion PGI. This means that all the boards corresponding to the elements that are located in the right-hand portion PDI will be supplied with electrical energy via the same supply means ALIMA, while all the elements contained in the left-hand portion PGI will be supplied through the same electrical energy supply means ALIMB. In the case of the particular exemplary embodiment shown in FIG. 3, the elements $A_1-A_6$ and the two common elements $C_3$ and $C_4$ are supplied with electrical energy via the supply means ALIMA, while the elements $B_1-B_6$ and the common elements $C_1$ and $C_2$ are supplied with electrical energy by the supply means ALIMB.

These electrical supply means are preferably independent of one another, and it will be understood that the number of electrical supply means may be different from two and may be greater than two.

Figure 4:
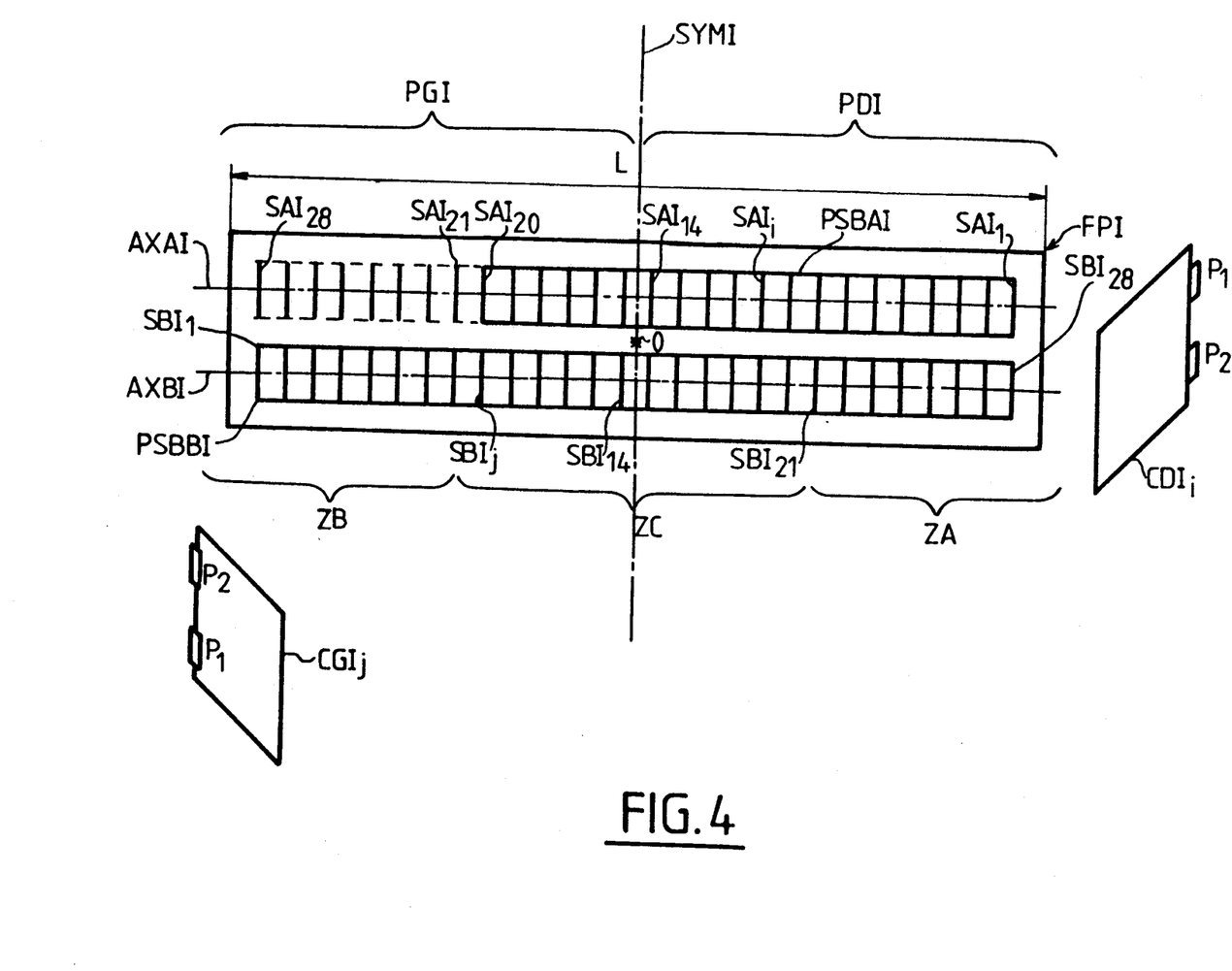
FIG. 4 is a schematic, simplified top view showing the basket bottom of the physical structure in the form of a basket, which corresponds to the architecture of the information processing system of the invention shown in FIG. 3.

FIG. 4 will now be described, which shows the basket bottom FPI of the basket containing the physical structure of the information processing system ORDI shown in FIG. 3. It will be noted that the information processing system comprises a single same physical structure, that is, the basket PAI (see FIG. 5), of which only the basket bottom FPI is shown in FIG. 4. The first difference in physical structure between the information processing system of the prior art shown in FIG. 2 and the information processing system of the invention shown in FIG. 3 is readily apparent; that is, the two sets $ENSI_1$ and $ENSI_2$ are disposed in the same, single basket, while the two equivalent sets of the system shown in FIG. 2 are disposed in two different baskets.

Figure 5:
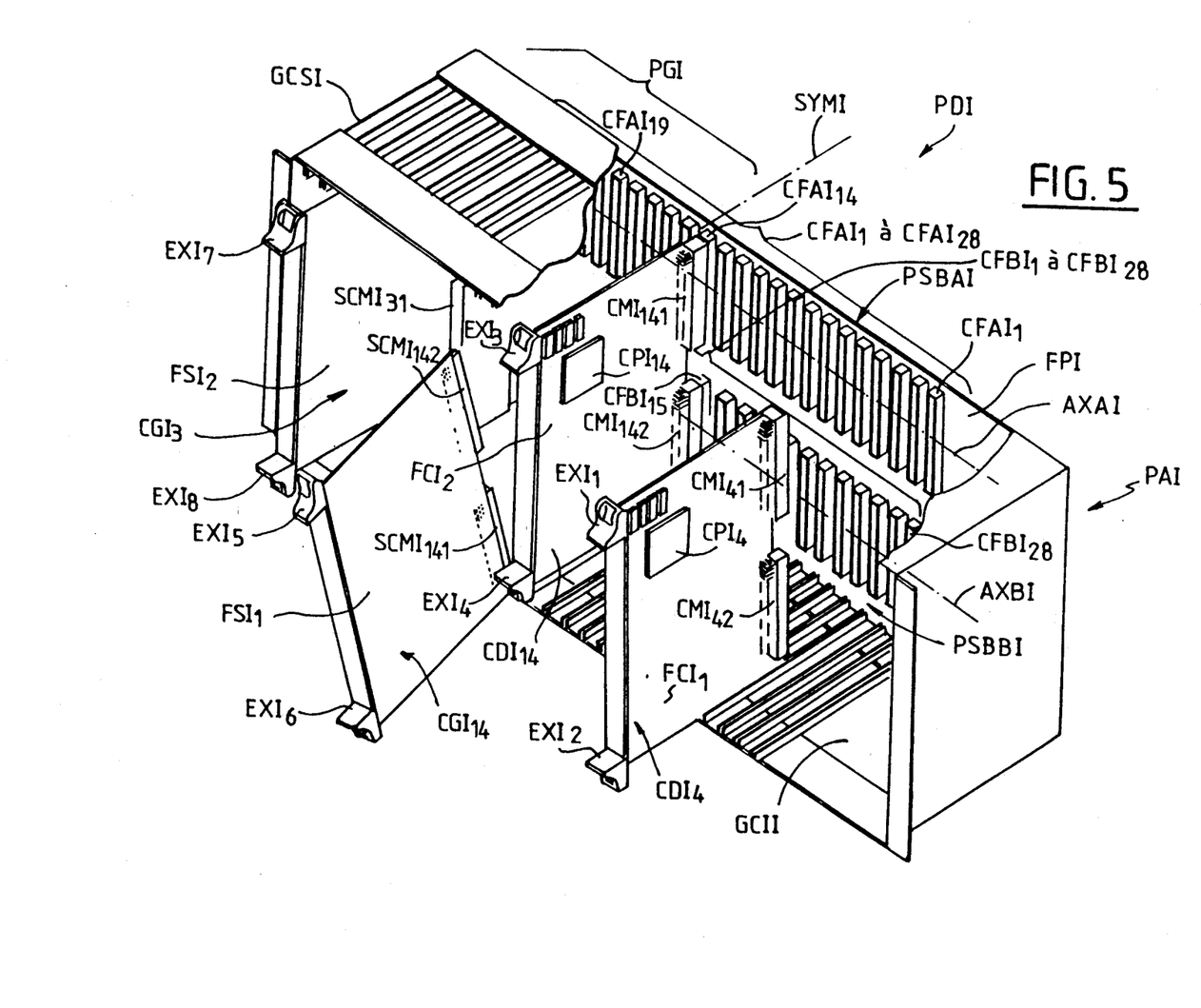
FIG. 5 is a ¾ cutaway perspective view showing the basket-shaped physical structure of the information processing system with two buses, according to the invention shown in FIG. 3.

FIG. 4 can be said to be an extremely simplified top view of the basket bottom FPI, the details of which are shown in more precision in FIG. 5.

The basket bottom FPI has a plane of symmetry SYMI perpendicular to its plane and to its length L (large dimension). It has a substantially rectangular shape and a center of symmetry 0, which naturally is the center of the rectangle. A line indicating this plane of symmetry SYMI on the plane of the basket bottom FPI has thus been shown in FIG. 4 as well.

On either side of the plane of symmetry SYMI, the right-hand portion PDI and left-hand portion PGI of the system ORDI are shown, respectively supplied via the supply means ALIMA and ALIMB.

The bus PSBAI of the Multibus II type is disposed in the upper portion of FIG. 4, while the bus PSBBI of the Multibus II type is disposed in the lower portion of the basket bottom FPI shown in FIG. 4.

In the exemplary embodiment shown in FIG. 4, it is assumed that $n=8$. Consequently the zones ZA and ZB can be seen to connect eight boards, representing elements of the information processing system ORDI. The common portion ZC can then, given that $m=20$, include 12 elements that are connected to it.

The basket bottom FPI includes 28 connection sites $SAI_1-SAI_{28}$ in its upper portion from right to left (at the top of FIG. 4), while its lower portion also includes 28 connection sites $SBI_1-SBI_{28}$ from left to right. The type of female plugs disposed on these connection sites will be described in greater detail below. The plugs corresponding to the connection sites $SAI_1-SAI_{28}$ are identified by reference symbols $CFAI_1-CFAI_{28}$, while the plugs disposed on the connection sites $SBI_1-SBI_{28}$ are identified as $CFBI_1-CFBI_{28}$.

The first 20 plugs $CFAI_1-CFAI_{20}$ disposed at the connection sites $SAI_1-SAI_{20}$ are electrically connected to the bus PSBAI, while the first 20 plugs $CFBI_1-CFBI_{20}$ disposed at the connection sites $SBI_1-SBI_{20}$ are electrically connected to the bus PSBBI.

The connection sites $SAI_{21}-SAI_{28}$ on the one hand and $SBI_{21}-SBI_{28}$ on the other are provided with plugs that are not electrically connected to the bus PSBAI and PSBBI, respectively. The reason for this is that the IEEE standard 1296, the number of plugs electrically connected to one bus of the Multibus II type must not exceed 20.

Fourteen boards $CDI_i$, with i being between 1 and 14, can be connected in the right-hand portion PDI of the basket bottom FPI. Naturally, as will be better understood from FIG. 5, any board $CDI_i$ connected in the right-hand portion PDI of the basket bottom FPI is perpendicular to the plane of the basket bottom. Any board $CDI_i$ includes a first male plug $P_1$ and a second male plug $P_2$, which are intended to be connected respectively to the female plugs of the same type located at the sites $SAI_i$ and $SBI_j$. The plug $P_1$ is defined by the DIN standard 41612 mentioned above, while the plug $P_2$ is free; that is, the engineer is given complete freedom in choosing its type. Consequently, it will be seen that all the female plugs $CFAI_1-CFAI_{14}$ (since the total number of connection sites is 28, the two portions, on the right and left, PDI and PGI each include 14 connection sites) are provided with female plugs of the type $P_1$ defined by the above-mentioned standard. It can also be seen that the connection sites $SBI_{15}-SBI_{28}$ of the right-hand portion PDI disposed on the lower portion of the basket bottom FPI are provided with female plugs $CFBI_{15}-CFBI_{28}$ of the type $P_2$.

The boards $CGI_j$ which are connected in the left-hand portion PGI of the basket bottom FPI perpendicular to it are mounted such that the plug disposed in the lower portion of the board is of the $P_1$ type, while the plug disposed in the upper portion of this same board is of the $P_2$ type. Nevertheless, the boards $CGI_j$ are mounted inversely of the boards $CDI_i$. Consequently the plug $CFAI_{14}$ located at the connection site $SAI_{14}$ is symmetrical with respect to the center of symmetry 0 of the plug $CFBI_{14}$ disposed at the connection site $SBI_{14}$, and the same is true, progressively, for the other plugs $CFAI_{13}-CFAI_1$ and $CFBI_{13}-CFBI_1$. In other words, the plug $CFAI_1$ is symmetrical with respect to the point 0 of the plug $CFBI_1$.

The situation is understood to be the same for the plugs $CFAI_{15}$ (which is of the $P_2$ type) and $CFBI_{15}$. They are symmetrical to one another with respect to the center of symmetry 0 and so forth, gradually nearer and nearer, for the plugs $CFAI_{16}-CFAI_{28}$ that are symmetrical with respect to the point 0 of the plugs $CFBI_{16}-CFBI_{28}$.

It should be noted that in a preferred embodiment of the invention, the plug $P_2$ is identical to the plug $P_1$ defined by the above-mentioned DIN standard 41612.

In FIG. 5, the plugs $CFAI_1-CFAI_{19}$ can be seen (the other plugs $CFAI_{20}-CFAI_{28}$ are hidden by the upper face of the basket PAI) making it possible to connect the boards $CDI_i$, $CGI_j$ to the bus PSBAI. Similarly the plugs $CFBI_{28}-CFBI_{15}$ of the bus PSBBI can be seen (the other plugs $CFBI_{14}-CFBI_1$ being hidden by other elements in FIG. 5).

All of the female plugs $CFAI_1-CFAI_{28}$ have the same axis of symmetry AXAI parallel to the length of the basket bottom FPI. Conventionally, but incorrectly, the plugs $CFAI_1-CFAI_{28}$ are said to be aligned on the same axis AXAI. The set $CFBI_1-CFBI_{28}$ also has the axis of symmetry AXBI parallel to AXAI (FIGS. 4 and 5). It is also said that the plugs $CFBI_1-CFBI_{28}$ are aligned on the same axis AXBI.

Moreover, each of the plugs $CFAI_1-CFAI_{28}$, $CFBI_1-CFBI_{28}$ has an axis of symmetry parallel to the width of the basket bottom FPI (and hence perpendicular to AXAI and AXBI), known as the vertical axis of symmetry, by mistaken linguistic convention. Any plug of the set $CFAI_1-CFAI_{28}$ and any corresponding plug of the set $CFBI_1-CFBI_{28}$ has the same vertical axis of symmetry. Thus, the plugs $CFAI_1$ and $CFBI_{28}$ have the same vertical axis of symmetry, $CFAI_2$ and $CFBI_{27}$ have the same vertical axis of symmetry, and so forth. It is clear that this disposition relative to the plugs of each of the two sets is indispensable to enable correct connection of the boards $CDI_i$ and $CGI_j$ to the inside of the basket PAI.

The basket PAI is provided with a bottom, (as shown in the drawing) board guide GCII (in fact, the side of the basket) and an upper, (as shown in the drawing) board guide GCSI (in fact, the other side of the basket), which are parallel to one another and perpendicular to the basket bottom FPI, because their plane is parallel to the length of the basket bottom. Both of these board guides GCSI and GCSII are provided with rails perpendicular in the plane of the basket bottom, inside which boards of the type $CDI_i$ and $CGI_j$ can slide in order to be introduced inside the basket and then connected to the various plugs $CFBI_1$-$CFBI_{28}$ and $CFAI_1$-$CFAI_{28}$. Introducing the boards in this way is quite well known and need not be described further here.

Two boards of the type $CDI_i$, that is, the boards $CDI_4$ and $CDI_{14}$, and two boards of the type $CGI_j$, that is, the boards $CGI_{14}$ and $CGI_3$, have been shown in FIG. 5.

The board $CDI_4$ is seen from the side, including certain integrated components. One of these, component $CPI_4$, is shown in FIG. 5 disposed on the board $CDI_4$, while the component $CPI_{14}$ is shown disposed on the board $CDI_{14}$.

The board $CDI_4$ is provided with the male plug $CMI_{41}$ of the $P_1$ type and the plug $CMI_{42}$ of the $P_2$ type (which in fact is identical to $P_1$ in the preferred exemplary embodiment of the invention), while the board $CDI_{14}$ is provided with male plugs $CMI_{141}$ and $CMI_{142}$, of the $P_1$ and $P_2$ types respectively.

The board $CGI_{14}$, which is mounted inversely of boards of the $CDI_i$ type, such as $CDI_4$ and $CDI_{14}$, with respect to the plane of symmetry SYMI, is thus seen from the side opposite the one that contains the components, or in other words from the welded side.

The board $CGI_{14}$ includes the plug $SCMI_{142}$ of the $P_2$ type, located in the upper portion of the board, (as skin in the drawing) and the plug $SCMI_{141}$, located in the lower portion, (as seen in the drawing).

The board $CGI_3$ is shown with its lower plug $SCMI_{31}$.

The plug $SCMI_{141}$ is symmetrical with the plug $CMI_{141}$ of the board $CDI_{14}$, with respect to the center of symmetry 0 of the basket bottom FPI. Similarly, with respect to the same center of symmetry 0, the plug $SCMI_{142}$ is symmetrical with the plug $CMI_{142}$ of the board $CDI_{14}$.

Each of the boards shown in FIG. 5 is provided with extraction means, on which a user can exert manual pressure from top to bottom and from bottom to top so as to introduce or remove the boards of the basket PAI.

The board $CDI_4$ is thus shown with its two extraction means $EXI_1$ and $EXI_2$; the board $CDI_{14}$ is shown with its two extraction means $EXI_3$ and $EXI_4$; the board $CGI_{14}$ is shown with its two extraction means $EXI_5$ and $EXI_6$; and finally, the board $CGI_3$ is shown with its two extraction means $EXI_7$ and $EXI_8$.

The board $CDI_4$ is shown introduced partway into the basket PAI. The board $CDI_{14}$ is shown introduced all the way inside the basket and connected to the plugs $CFAI_{14}$ and $CFBI_{15}$, while the board $CGI_{14}$ is shown outside the basket PAI, and the board $CGI_3$ is shown introduced partway into the basket.

It is seen that the architecture structure according to the invention makes it possible to connect more boards in a basket bottom such as FPI than in a basket bottom of the conventional type using the same bus, such as a Multibus II type bus PSB.

Figure 6:
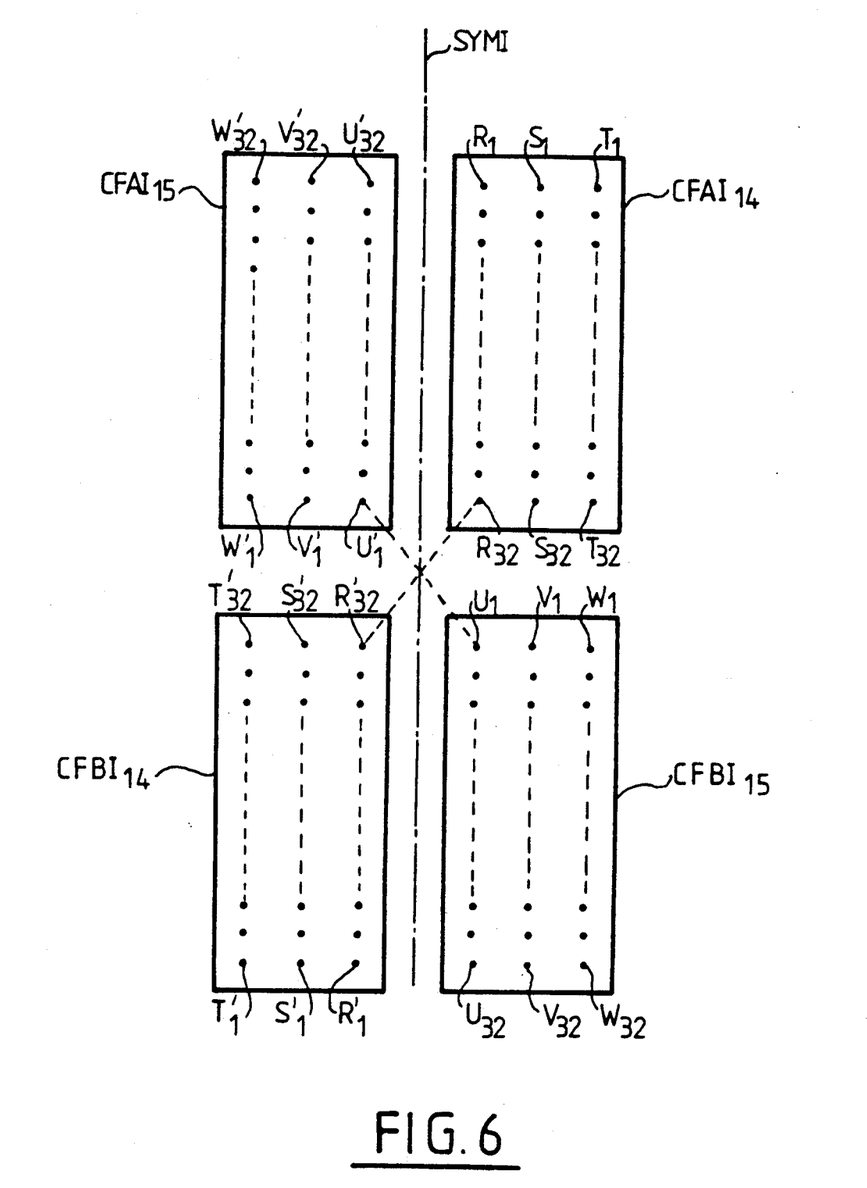
FIG. 6 is a simplified top view showing four female plugs disposed on the connection sites of the bottom of the basket corresponding to the information processing system of the invention, disposed on either side of the plane of symmetry of the basket perpendicular to the length of the basket bottom.

Turning to FIG. 6, the female plugs of the two buses PSBAI and PSBBI closest to the plane of symmetry SYMI are seen from the top. These plugs are the plugs $CFAI_{14}$ and $CFAI_{15}$ in the upper part of FIG. 6, and the plugs $CFBI_{14}$ and $CFBI_{15}$ in the lower portion of FIG. 6. Thus as has been mentioned above, the two plugs $CFAI_{14}$ and $CFBI_{14}$ are symmetrical to one another with respect to the center of symmetry 0 of the basket bottom FPI. Similarly, the two plugs $CFAI_{15}$ and $CFBI_{15}$ are symmetrical to one another with respect to this same center of symmetry 0.

The plug $CFAI_{14}$ thus includes 96 pins in three parallel rows, that is $R_1$-$R_{32}$, $S_1$-$S_{32}$, $T_1$-$T_{32}$, from left to right and top to bottom in the drawing figure, while the plug $CFBI_{14}$ includes three rows of 32 pins, that is, $R'_1$-$R'_{32}$, $S'_1$-$S'_{32}$ and $T'_1$-$T'_{32}$ from right to left and bottom to top.

The same is true for the plugs $CFBI_{15}$ and $CFAI_{15}$. The plug $CFBI_{15}$ is provided with three rows of 32 pins $U_1$-$U_{32}$, $V_1$-$V_{32}$ and $W_1$-$W_{32}$, from left to right and top to bottom, while the plug $CFAI_{15}$ is provided with three parallel rows of 32 pins, $U'_1$-$U'_{32}$, $V'_1$-$V'_{32}$, $W'_1$-$W'_{32}$, from right to left and bottom to top in FIG. 6.

The relative disposition of the boards $CDI_i$ and $CGI_j$ means that it is impossible to insert a board in the wrong direction. Hence a board $CDI_i$ cannot be introduced into the left-hand portion PGI, and a board $CGI_j$ cannot be introduced into the right-hand portion PDI. This is due to the disposition of the plugs on the cards. In fact, looking at the bottom of the basket (from left to right in FIG. 5), it is seen that the plugs are placed on the right of the boards $CDI_i$ and on the left of the boards $CGI_j$. The insertion of a board $CGI_j$ in the right-hand portion PDI would thus make the plugs of the board strike the plugs of a board $CDI_i$, and inserting the board farther into the basket, which would make connection impossible, cannot be done.

The advantages of the architecture of the system ORDI shown in FIGS. 4–6 are follows:

very high availability, equivalent to two separate sets, is obtained simply by supplying the two right-hand and left-hand portions PDI and PGI from two independent supply means ALIMA and ALIMB;

it has a physical structure enabling support of the elements common to the two sets;

high-performance access to the common elements (the performance of the bus of the Multibus II type) is attained;

the invention is applicable to any standard or non-standard type of bus, on the condition that the buses are defined on a single plug, the second being free;

the boards of zones ZA and ZB, as well as zone ZC, can be of an entirely standard type in terms of the their plug $P_1$;

this architecture makes it possible to incorporate two separate sets $ENSI_1$ and $ENSI_2$ in the same basket bottom FPI by avoiding specific cable connections between the boards, which would certainly cost much more and have less powerful performance.

I claim:

1. An information processing system architecture (ORDI), including at least a first and a second set of operating circuits ($ENSI_1$, $ENSI_2$), made up of a plurality of constituent elements ($B_1$-$B_6$, $A_1$-$A_6$) embodied by printed circuits supporting a plurality of integrated circuits, said constituent elements being mounted on a plurality of boards ($CDI_1$, $CGI_1$), at least some of the constituent elements of said first set being identical to at least one of the constituent elements of said second set, the first and second sets being operatively connected to first and second system buses of the parallel type (PSBAI, PSBBI) for assuring communications and the transfer of data and electrical energy among the boards, each of said first and second system buses having a plurality of connection sites associated therewith, the architecture further including a third set of elements common to both of said first and second sets, and accessible simultaneously by any element of said first and said second sets, wherein said first and second buses are positioned such that between them there is provided an at least partial overlap of said plurality of connection sites of said first and said second system buses in an overlap zone (ZC) wherein said overlap zone provides:

first means for connecting at least one element ($C_1$-$C_2$, $C_3$-$C_4$) of said third set of common elements to both of said system buses;

second means for additionally connecting at least one element of said first set ($ENSI_1$, $A_5$ and $A_6$) to both of said system buses; and third means for additionally connecting at least one element of said second set ($ENSI_2$, $B_5$ and $B_6$) to both of said system buses.

2. The information processing system architecture (ORDI) of claim 1, characterized in that the two buses comprise a first bus (PSBAI) having a given number (m) of connection sites, and a second bus (PSBBI) identical and parallel to the first bus but offset with respect to it by a given number (n) of connection sites ($SAI_{21}$-$SAI_{28}$, $SBI_{21}$-$SBI_{28}$) in such a manner that the set formed by the two buses includes a first zone (ZA) where a first set of n boards is connected that is joined to the first bus, and a second zone (ZB) where a second set of n boards connected to the second bus is connected, the third zone (ZC) comprising the overlap zone, including (m−n) connection sites.

3. The architecture of claim 1, the physical structure of which is a logic board basket (PAI), including a basket bottom (FPI) of substantially rectangular form, having a center of symmetry (0) and a plane of symmetry (SYMI) perpendicular to the plane of the basket bottom and to its large dimension (length L), characterized in that the basket bottom (FPI) carries the first and second buses (PSBAI and PSBBI) and includes a first row of (m +n) connection sites ($SAI_1$-$SAI_{28}$) of the first bus carrying female plugs ($CFBI_1$-$CFBI_{28}$) and having a second axis of symmetry parallel to the length of the basket bottom, and a second row of (m+n) connection sites ($SBI_1$-$SBI_{28}$) of the second bus carrying female plugs ($CFBI_1$-$CFBI_{28}$) and having a second axis of symmetry parallel to the first, the connection sites and the first and second rows being aligned two by two along the same line parallel to the width of the basket bottom, the plugs of the first row located in a first half (or second half) of the basket on the same side of the plane of symmetry (SYMI) being mounted symmetrically to the plugs of the second row located in the second half (or first half) of the basket (PAI) on the other side of the plane of symmetry, with respect to the center of symmetry, the boards connected to the sites of the first half being mounted symmetrically with the boards connected to the sites of the second half with respect to this center of symmetry.

4. The architecture of claim 1, characterized in that at least one of the buses is of a Multibus II type, the corresponding plugs being 96-pin plugs in three parallel rows of 32 each.

5. The architecture of claim 2, characterized in that at least one of the buses is of a Multibus II type, the corresponding plugs being 96-pin plugs in three parallel rows of 32 each.

6. The architecture of claim 3, characterized in that at least one the buses is of a Multibus II type, the corresponding plugs being 96-pin plugs in three parallel rows of 32 each.

7. The architecture of claim 4, characterized in that each board carries two plugs, one of which is of a first type $P_1$ depending on the nature of the first bus and the other of which is of a second type $P_2$ depending on the nature of the second bus.

8. The architecture of claim 5, characterized in that each board carries two plugs, one of which is of a first type $P_1$ depending on the nature of the first bus and the other or which is of a second type $P_2$ depending on the nature of the second bus.

9. The architecture of claim 6, characterized in that each board carries two plugs, one of which is of a first type $P_1$ depending on the nature of the first bus and the other or which is of a second type $P_2$ depending on the nature of the second bus.

10. The architecture of claim 5, characterized in that the plug of the $P_2$ type is identical to the plug of the $P_1$ type.

11. The architecture of claim 6, characterized in that the plug of the $P_2$ type is identical to the plug of the $P_1$ type.

12. The architecture of claim 7, characterized in that the plug of the $P_2$ type is identical to the plug of the $P_1$ type.

* * * * *

UNITED STATES PATENT AND TRADEMARK OFFICE
CERTIFICATE OF CORRECTION

PATENT NO. : 5,225,967
DATED : July 6, 1993
INVENTOR(S) : CARTEAU

It is certified that error appears in the above-identified patent and that said Letters Patent is hereby corrected as shown below:

Col. 13, lines 24 & 25, (Claim 2, lines 6 & 7), "$SAI_{2-1}$" should be -- $SAI_{21}$ --.

Col. 13, line 41, (Claim 3, line 10), after "female plugs" delete "($CFBI_1$-$CFBI_{28}$) and having a second" and substitute -- ($CFAI_1$-$CFAI_{28}$) all having a first --.

Signed and Sealed this

Twenty-fourth Day of May, 1994

BRUCE LEHMAN

*Attest:*

*Attesting Officer*   Commissioner of Patents and Trademarks